(12) United States Patent
Fan

(10) Patent No.: US 9,678,419 B2
(45) Date of Patent: Jun. 13, 2017

(54) MULTIFUNCTIONAL PANORAMIC HEAD AND PANORAMIC IMAGE CAPTURE SYSTEM

(71) Applicants: FANOTEC INTERNATIONAL LIMITED, Hong Kong (HK); Shenzhen Youxingda Precision Hardware Co., Ltd., Shenzhen, Guangdong (CN)

(72) Inventor: Mau Nam Fan, Hong Kong (HK)

(73) Assignees: FANOTEC INTERNATIONAL LIMITED, Hong Kong (HK); Shenzhen Youxingda Precision Hardware Co., Ltd., Shenzhen (CN)

( * ) Notice: Subject to any disclaimer, the term of this patent is extended or adjusted under 35 U.S.C. 154(b) by 376 days.

(21) Appl. No.: 14/609,449

(22) Filed: Jan. 30, 2015

(65) Prior Publication Data
US 2015/0365572 A1 Dec. 17, 2015

(30) Foreign Application Priority Data
Jun. 17, 2014 (CN) .......................... 2014 1 0271289

(51) Int. Cl.
| | |
|---|---|
| H04N 5/225 | (2006.01) |
| H04N 5/232 | (2006.01) |
| G03B 17/00 | (2006.01) |
| H04N 7/00 | (2011.01) |
| G03B 37/02 | (2006.01) |
| F16M 11/20 | (2006.01) |
| G03B 17/56 | (2006.01) |

(52) U.S. Cl.
CPC ......... *G03B 37/02* (2013.01); *F16M 11/2007* (2013.01); *G03B 17/561* (2013.01); *H04N 5/23238* (2013.01)

(58) Field of Classification Search
CPC .. H04N 5/2254; H04N 5/23238; G03B 37/02; G03B 17/561; F16M 11/2007
USPC .......................................................... 348/36
See application file for complete search history.

(56) References Cited

U.S. PATENT DOCUMENTS

| | | | | | |
|---|---|---|---|---|---|
| 5,074,397 | A | * | 12/1991 | Mukai ..................... | B65G 29/00 198/343.1 |
| 6,141,034 | A | * | 10/2000 | McCutchen ........... | G02B 27/22 348/36 |
| 2010/0092165 | A1 | * | 4/2010 | Cartoni .................. | F16M 11/10 396/428 |

* cited by examiner

*Primary Examiner* — Hee-Yong Kim

(57) ABSTRACT

The invention provides a multifunctional panoramic head, including a horizontal rotating device, a vertical rotating device, a transverse arm and a vertical arm, the vertical rotating device includes a rotary disc, a vertical indexing disc and a locating component, the rotary disc and the vertical indexing disc are set on the upper part of the vertical arm, the locating component is set within the vertical arm, and the locating component includes a locating component body, a plurality of locating pins which are assembled together with the locating component body and a locating switch handle which can control the locating pins to stretch out and draw back. The invention also provides a panoramic image capture system. The invention can achieve precise angular positioning of a camera and lens, enhancing the stability of the head, reducing image blurring and hence improving success rate of panoramic image creation and stitching efficiency.

20 Claims, 5 Drawing Sheets

MULTIFUNCTIONAL PANORAMIC HEAD AND PANORAMIC IMAGE CAPTURE SYSTEM

CROSS-REFERENCE TO RELATED APPLICATIONS

The present application claims the benefit of Chinese Patent Application No. 201410271289.0 filed on Jun. 17, 2014, the entire content of which is hereby incorporated by reference.

FIELD OF THE INVENTION

The invention relates to panoramic photography where images are stitched together to form a single image with a much wider angle of view. In particular, the invention relates to a multifunctional panoramic head and a panoramic image capture system, comprising the head, a camera and a lens, that allows the images to be captured and stitched efficiently.

BACKGROUND

There is an increasing demand for higher and higher resolution in digital photography, especially in panoramic landscape photography. Digital stitching of images to form a panorama or a mosaic is an effective means to increase the angle of view and/or the resolution of the stitched image. Typically, a series of images are shot from continuous angles at constant intervals and are combined by stitching software to form a picture, whose angle of view is several times to hundreds of times of that of the original image. To achieve perfect stitching, it commonly needs to use a panoramic head which essentially includes three supporting members serially hinged, wherein the first member can rotate around a panning axis horizontally and slide left and right, the second member supports the third member vertically, and the third member can rotate around a tilting axis vertically and slide back and forth. This allows the camera and lens to be precisely set to rotate about the entrance pupil of a lens, eliminating parallax error. However, these basic panoramic heads have the following disadvantages: the rotators have no or coarse indexing. Without indexing when heavier camera and lens, particularly long focal length lens is used, it is easy to droop in the vertical direction, thus increasing difficulties of image stitching and chances of destroying integrity of the whole panoramic image by leaving empty gaps in the image. With coarse indexing, a low limit of focal length and hence resolution of the panoramic image is imposed.

SUMMARY

In order to overcome the disadvantages of the existing panoramic head, the invention provides a multifunctional panoramic head, which can provide high density rotary disc indexing, can rapidly adjust indexing value, and can lock the rotating axle after completing indexing, thus achieving precise angular positioning of a camera and lens, enhancing the stability of the head, reducing image blurring due to vibration, and hence improving success rate of panoramic image creation and stitching efficiency. The invention also provides a panoramic image capture system, comprising a camera, a lens, and the multifunctional panoramic head described herein.

The multifunctional panoramic head provided by the invention includes a horizontal rotating device, a vertical rotating device, as well as a transverse arm and a vertical arm connecting the horizontal rotating device and the vertical rotating device together, the vertical rotating device includes a rotary disc, a vertical indexing disc and a locating component, the rotary disc and the vertical indexing disc are set on the upper part of the vertical arm, the locating component is set within the vertical arm, and the locating component includes a locating component body, a plurality of locating pins which are assembled together with the locating component body and a locating switch handle which can control the locating pins to stretch out and draw back.

As further improvement of the invention, multiple lines of locating through-slots are set on the locating component body, a spring is also set on the locating pins, the locating pins and the spring pass through the locating through-slots and are assembled together with the locating switch handle.

As further improvement of the invention, multiple lines of locating holes distributed along concentric circles are set on the vertical indexing disc, and the locating through-slots on the locating component body correspond to the locating holes.

As further improvement of the invention, a central angle corresponding to adjacent locating slots in the same line is equal to the central angle of the corresponding locating holes multiplied by a multiple, and the multiple is an integral plus 1/n, wherein, n is the number of the locating slots in this line.

As further improvement of the invention, the vertical rotating device is setup with a rotary disc locking handle for fixing the rotary disc, an angle value is marked at the locating holes of the vertical indexing disc, and the vertical indexing disc is also setup with vertical indicator collets for indicating angle limits.

As further improvement of the invention, the horizontal rotating device includes a quick release structure component and a rotating component set below the quick release structure component, and the horizontal rotating device is movably connected with the transverse arm.

As further improvement of the invention, the rotating component includes a rotary locating disc which, on the upper part, has a plurality of circles of rotary locating holes distributed along concentric circles.

As further improvement of the invention, the quick release structure component includes a quick release structure body, multiple plunger holders set on both ends of the quick release structure body, an encircling locking ring and a locking handle for locking the quick release structure body with the rotating component.

As further improvement of the invention, the plunger holders are setup with plungers in coordination with the rotary locating holes, a central angle corresponding to adjacent plungers is equal to the central angle of the coordinated rotary locating holes multiplied by a multiple, and the multiple is an integral plus 1/n, wherein, n is the number of the plungers in the same concentric circle.

As further improvement of the invention, the quick release structure component also includes a locking press block and a quick release locking handle for fixing the locking press block on the quick release structure body, and the locking press block locks the horizontal rotating device on the transverse arm.

As further improvement of the invention, the rotating component includes a dial piece, a rotary locating disc and a rotary disc base, the rotary locating disc is fixed on the rotary disc base by screws on the side, and an indicator collet is also set on the side of the dial piece for setting the angle limit.

As further improvement of the invention, the horizontal rotating device also includes a compression nut, an upper bearing and a lower bearing, the quick release structure component includes an upper bearing groove, the rotary disc base is setup with an external thread, a lower bearing groove and a cylinder for being locked by the encircling locking ring, and the compression nut connects the upper bearing, the lower bearing, the quick release structure component and the rotary disc base into one.

As further improvement of the invention, a lighting device is also set within the vertical arm, and the lighting device includes a battery pack, a battery holder for installing the battery pack, a battery cover, an LED light and a switch.

As further improvement of the invention, a cantilever which is assembled together with the vertical indexing disc and can mount the camera is set on the vertical arm.

The invention also provides a panoramic image capture system, comprising a camera, a lens, and the multifunctional panoramic head described above.

The invention has high density and rapid indexing adjustment, can achieve precise angular positioning of a camera and lens, enhancing the stability of the head, reducing image blurring due to vibration, and hence improving success rate of panoramic image creation and stitching efficiency.

BRIEF DESCRIPTION OF THE DRAWINGS

In order to illustrate technical schemes in examples of the invention more clearly, the drawings to be used in the examples will be simply presented below, it is obvious that drawings in the following description are only some examples of the invention, and for one of ordinary skill in the art, other drawings also can be obtained according to these drawings without creative work.

DETAILED DESCRIPTION

In order to clearly understand the purpose, technical schemes and advantages of the invention, the invention will be further illustrated in detail in conjunction with the drawings and examples. It should be understood that the specific examples described here are merely for explaining the invention, but not for limiting the invention.

Figure 1:
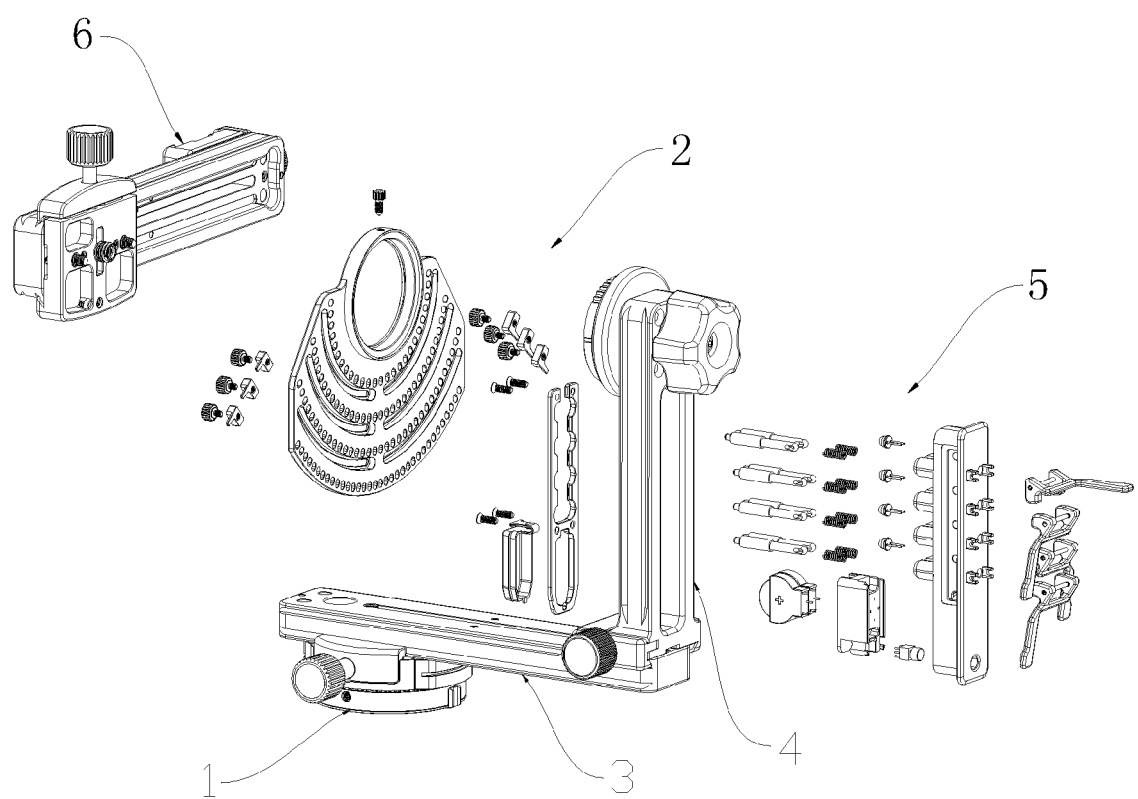
FIG. 1 is a structural schematic diagram of the multifunctional panoramic head of the invention.

Referring to FIG. 1, FIG. 1 is a structural schematic diagram of the multifunctional panoramic head of the invention. The multifunctional panoramic head includes a horizontal rotating device 1, a vertical rotating device 2 set on the upper part of the horizontal rotating device 1, the horizontal rotating device 1 and the vertical rotating device 2 are connected together by a transverse arm 3 and a vertical arm 4, the vertical arm 4 is vertically set on the transverse arm 3 by a quick release clamp, the vertical arm 4 can slide back and forth on the transverse arm 3, a locating component 5 is set on the vertical arm 4, a cantilever 6 which can mount the camera is also set on the vertical arm 4, the cantilever 6 is mounted on the vertical arm 4 by a quick release clamp, and the quick release clamps described above all employ the prior art.

Figure 2:
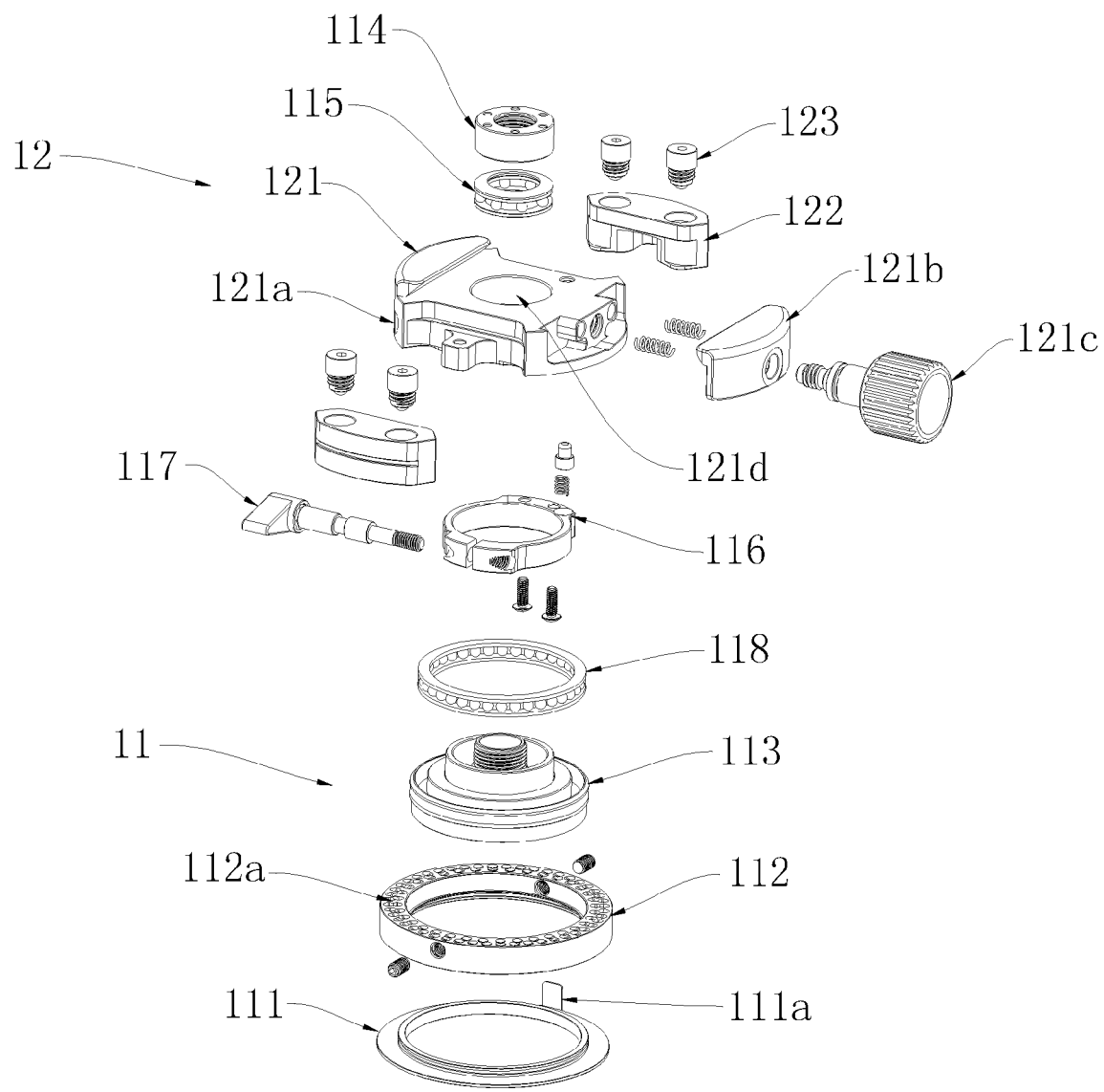
FIG. 2 is a structural explosion diagram of the horizontal rotating device of the invention.

Referring to FIG. 2, FIG. 2 is a structural explosion diagram of the horizontal rotating device 1 of the invention. The horizontal rotating device 1 includes a rotating component 11 and a quick release structure component 12, the rotating component 11 includes a dial piece 111, a rotary locating disc 112 and a rotary disc base 113, a scale is set on the side of the rotary locating disc 112 to indicate the rotation angle value, and a indicator collet 111$a$ is also set on the side of the dial piece 111 to set angle limits.

The quick release structure component 12 includes a quick release structure body 121, a upper bearing groove 121$d$ set above the quick release structure body 121, plunger holders 122 set on both ends of the quick release structure body 121, and a plurality of plungers 123 which are assembled together with the plunger holders 122 and achieve locating indexing of the horizontal rotating device 1 by cooperating with the rotary locating holes 112$a$. The plungers 123 have screw threads set on its base and hexagonal grooves set on its top, the plunger holders 122 are setup with locating screw holes, and the plungers 123 are screwed in the screw holes of the plunger holders 122 by a hexagonal wrench.

The horizontal rotating device 1 also includes compression a nut 114 with internal threads, an upper bearing 115, an encircling locking ring 116, a locking handle 117 and a lower bearing 118.

Figure 3:
FIG. 3 is a structural schematic diagram of the rotary locating disc of the invention.

Referring to FIG. 3, FIG. 3 is a structural schematic diagram of the rotary locating disc 112 of the invention. A plurality of circles of rotary locating holes 112$a$ distributed along concentric circles are set on the rotary locating disc 112.

Multiple plungers 123 distributed along concentric circles protrude and press against the rotary locating disc 112. When the quick release structure body 121 rotates, the steel ball of the plungers will roll on the surface of the rotary locating disc 112. When steel balls are aligned with the rotary locating holes 112$a$ of the rotary locating disc 112, the steel balls will be blocked in the rotary locating holes 112$a$ and produce resistance to achieve a grid of indexing. The central angle corresponding to adjacent plungers 123 in the same concentric circle is equal to the central angle of the coordinated rotary locating holes 112$a$ multiplied by a multiple, and the multiple is an integral plus 1/n, wherein, n is the number of the plungers in the same concentric circle. In this example, n is 2. On the assumption that the central angle corresponding to adjacent plungers 123 is $\alpha$, and that the central angle corresponding to adjacent rotary locating holes 112$a$ is $\beta$, when the integral is 1, the relationship between $\alpha$ and $\beta$ is: $\alpha=\beta*(1+\frac{1}{2})$; when the integral is 2, the relationship between $\alpha$ and $\beta$ is: $\alpha=\beta*(2+\frac{1}{2})$, and so on. The value of the integral is determined according to specification of the panoramic head. The smaller is $\beta$ and the rotating device, the greater the value of the integral may be needed, and in this example, the value of the integral is 1.

Figure 4:
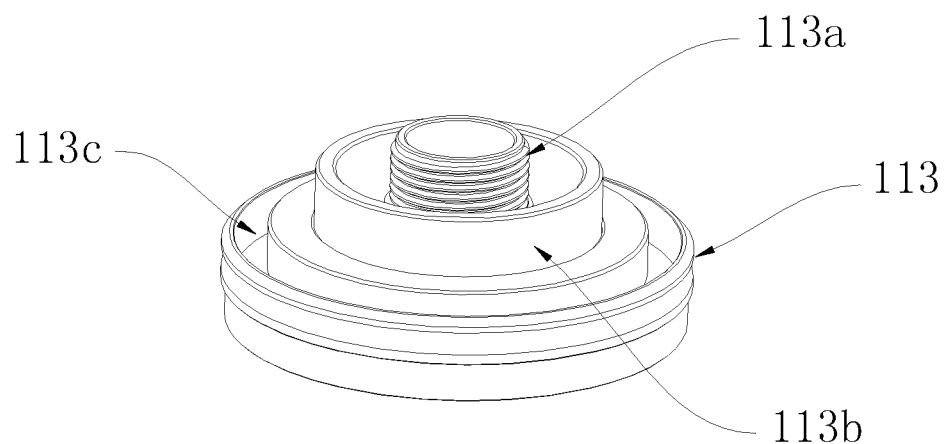
FIG. 4 is a structural schematic diagram of the rotary disc base of the invention.

Referring to FIG. 4, FIG. 4 is a structural schematic diagram of the rotary disc base of the invention. The rotary disc base 113 is setup with an external thread 113$a$, a lower bearing groove 113$c$ and a cylinder 113$b$ for being locked by the encircling locking ring 116.

The compression nut 114 presses the upper bearing 115 in the upper bearing groove 121$d$ of the quick release structure body 121, the lower bearing 118 is set within the lower bearing groove 113c, the encircling locking ring 116 is sheathed on the outside of the cylinder 113b and locks the rotary disc base 113 on the quick release structure body 121 by the locking handle 117, and a through hole 121a for the locking handle 117 to pass through is set on the quick release structure body 121.

On both sides, the quick release structure body 121 is also setup with a locking press block 121b and a quick release locking handle 121c for fixing the locking press block 121b on the quick release structure body 121. The locking press block 121b locks the horizontal rotating device 1 on the transverse arm 3, can adjust tightness between the locking press block 121b and the transverse arm 3 by the quick release locking handle 121c, and allow the horizontal rotating device 1 to slide back and forth and be fixed on the transverse arm 3.

Of course, horizontal rotating device 1 is not limited to above structure, and other prior arts which can achieve similar functions can also serve as the horizontal rotating device of the invention.

Figure 5:
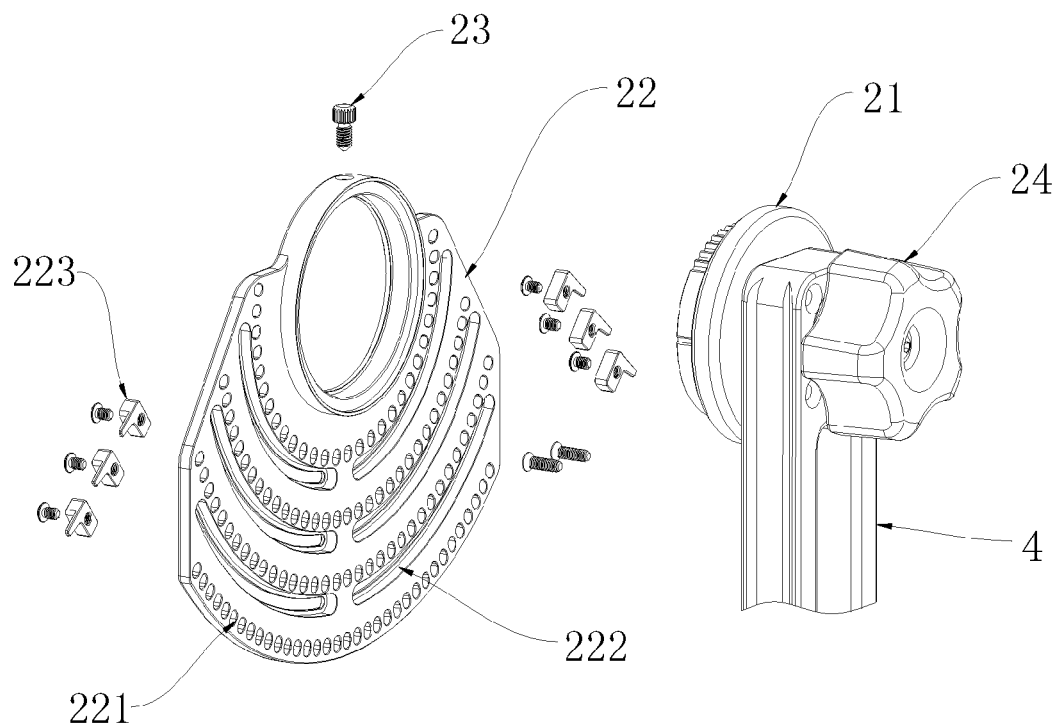
FIG. 5 is a structural schematic diagram of the vertical rotating device of the invention.

Referring to FIG. 5, FIG. 5 is a structural schematic diagram of the vertical rotating device 2 of the invention. The vertical rotating device 2 includes a rotary disc 21 set on the upper part of the vertical arm 4, a vertical indexing disc 22 set on one side of the rotary disc 21 and a rotary disc locking handle 24 which is set on the vertical arm 4 and used for locking the rotary disc 21 and can adjust tightness of the rotary disc 21. The vertical indexing disc 22 is fixed on the rotary disc 21 by the locking screws 23, and the vertical indexing disc 22 has multiple lines of locating holes 221 distributed along concentric circles, multiple lines of locating slots 222 distributed along concentric circles as well as vertical indicator collets 223 fixed in the locating slots 222 by screws. In the same line, interval between locating holes 221 and space between the locating holes and the center of the concentric circles determine the indexing value of the vertical indexing disc 22, and a number is marked at the locating hole 221 for indicating the angle value of the vertical indexing disc 22.

Figure 6:
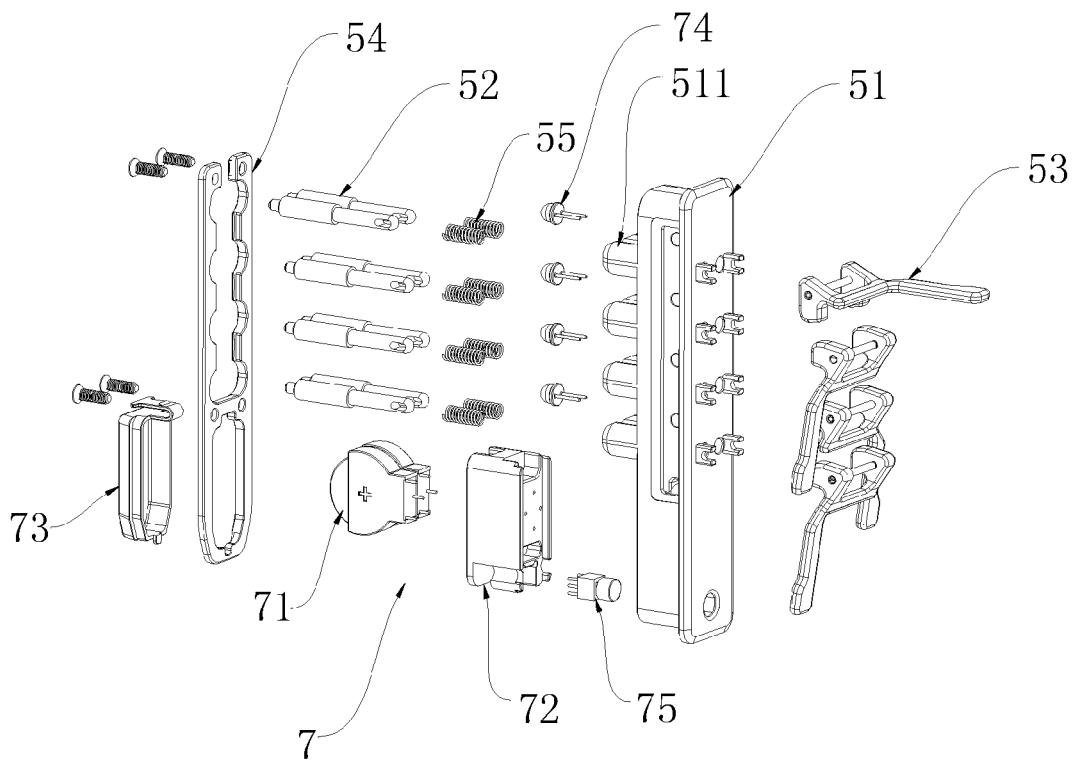
FIG. 6 is a structural explosion diagram of the locating component of the invention.

Referring to FIG. 6, FIG. 6 is a structural explosion diagram of the locating component 5 of the invention. The locating component 5 includes a locating component body 51, multiple locating pins 52 which are assembled together with the locating component body 51 and can locate the vertical indexing disc 22, a locating switch handle 53 which can control the locating pins 52 to stretch out and draw back and a clamping block 54 which inlays the locating component body 51 into the vertical arm 4. The locating component body 51 is setup with multiple lines of locating through-slots 511 distributed along concentric circles and passing through from left to right, and the positions of the locating through-slots 511 correspond to the locating holes 221 on the vertical indexing disc 22.

A spring 55 is sheathed on one end of the locating pin 52, the locating pin 52 passes through the straight locating slot 511 and compresses the spring 55 to be connected to the locating switch handle 53, the locating pin 52 can independently stretch out and draw back, and the size of the other end of the locating pin 52 corresponds to that of the locating hole 221. When the locating switch handle 53 is raised up, the locating pin 52 is insert into the locating hole 221 of the vertical indexing disc 22 under the elastic action of the spring 55; when the locating switch handle 53 is pressed, the locating pin 52 is pulled out of the locating hole 221. A central angle corresponding to adjacent locating slots 511 or adjacent locating pins 52 in the same line is equal to the central angle of corresponding adjacent locating holes 221 multiplied by a multiple, and the multiple is an integral plus 1/n, wherein, n is the number of the locating slots 511 or locating pins 52 in this line. In this example, n is 2. On the assumption that the central angle corresponding to adjacent locating slots 511 or adjacent locating pins 52 is α, and that the central angle of its corresponding adjacent locating holes 221 is β, when the integral is 1, the relationship between α and β is: α=β*(1+½); when the integral is 2, the relationship between α and β is: α=β*(2+½), and so on. The value of the integral is determined according to specification of the panoramic head. The smaller the value of β and the size of indexing disc, the greater the value of the integral may be needed, and in this example, the value of the integral is 1. Whenever the rotary disc 21 rotates 1/n interval between the locating holes 221, one locating pin 52 is aligned with the locating hole 221 and locks the vertical indexing disc 22, so the minimal indexing interval is 1/n interval between the locating holes 221.

A lighting device 7 is also set within the vertical arm 4, including a battery pack 71, a battery holder 72 for installing the battery pack 71, a battery cover 73, an LED light 74 and a switch 75. The lighting device 7 can provide adequate light source in low light environment.

Figure 7:
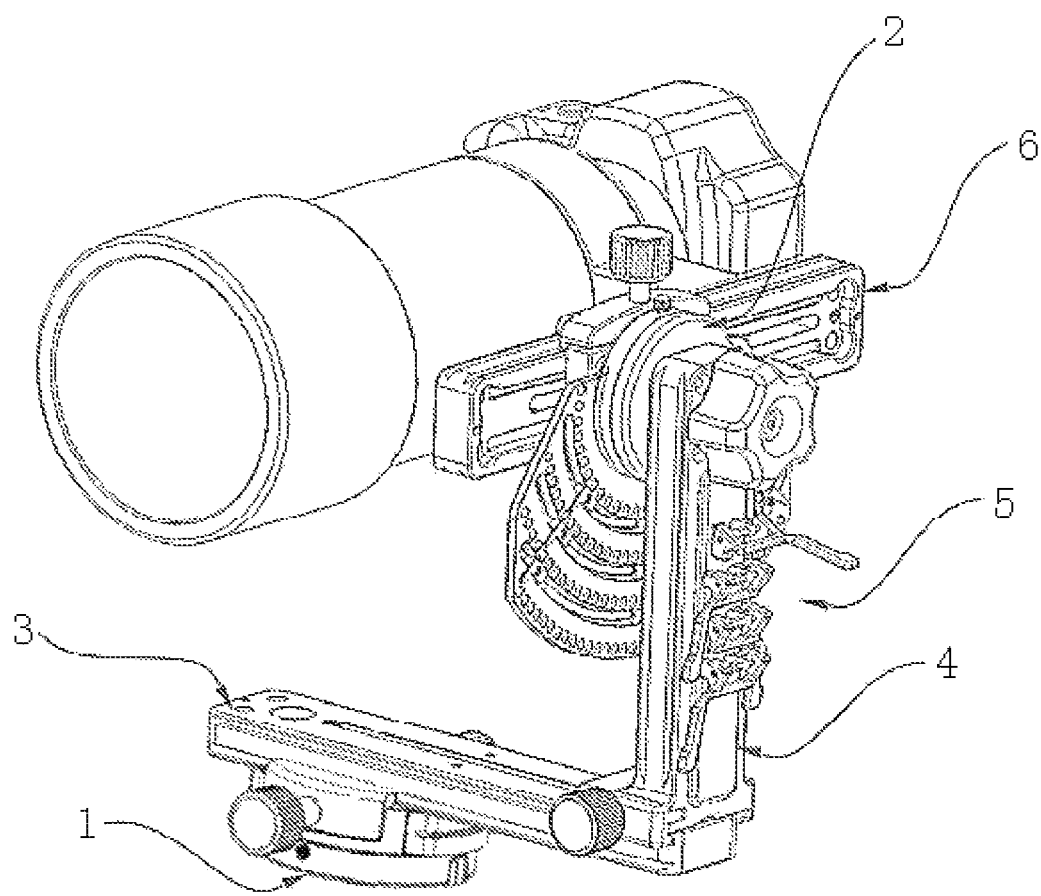
FIG. 7 is a structural schematic diagram of the panoramic image capture system of the invention.

Referring to FIG. 7, FIG. 7 is a structural schematic diagram of the panoramic image capture system of the invention. The camera is mounted on the cantilever 6 by a quick release clamp and can slide back and forth along the cantilever 6, the bottom of the horizontal rotating device 1 is fixed on a tripod head, and this quick release clamp also employs the prior art.

When the invention is used for shooting, the locating pin 52 is aligned with the locating hole 221 of the vertical indexing disc 22 by adjusting the vertical indexing disc 22 to a proper position, then the locating switch handle 53 is raised up, and the locating pin 52 will be blocked in the locating hole 221 to lock the vertical indexing disc 22. In order to perform indexing, the locating switch handle 53 is pressed, the vertical indexing disc 22 is rotated to the next angle according to the angle value of the locating hole 221, then the locating switch handle 53 is raised up to lock the vertical indexing disc 22.

The plunger will be blocked in the rotary locating holes 112a by screwing one or n plungers 123 in and adjusting the quick release body 12 to a proper position, and produce resistance, and after the panoramic head is horizontally rotated 1/n interval, another plunger will also be blocked in the rotary locating holes 112a and produce resistance, thus achieving a grid of indexing. In low light environment or in strong winds, the handle 117 can also be screwed down to lock the encircling locking ring 116 and screw down the rotary disc locking handle 24, thus achieving precise angular positioning of a camera and lens, enhancing the stability of the head, reducing image blurring due to vibration, and also improving success rate of panoramic image creation and stitching efficiency.

Operation steps of the invention are as follows:

S1: Select suitable vertical and horizontal angle intervals according to requirements of the camera and lens;

S2: Screw the plungers of the horizontal rotating device 1 to the selected interval, rotate the horizontal rotating device 1 to 0 degree of the scaled ring, and rotate the head of the tripod or move the tripod to the leftmost scene of interest to complete setting of the leftmost picture composition boundary;

S3: Rotate the horizontal rotating device 1 to the rightmost scene of interest, and rotate the dial piece 111 to align the indicator collet 111a with a reference point on the side of the horizontal rotating device 1 to complete setting of the rightmost picture composition boundary;

S4: Press all locating switch handles 53, rotate the rotary disc 21 to the highest scene of interest, slowly raise up the selected locating switch handle 53, reach out the locating pin 52, align the locating pin 52 with the next locating hole 221 outward, raise up the locating switch handles 53 completely, block the locating pins 52 in the locating holes 221, lock the rotary disc 21, then move the vertical indicator collet 223 to align the vertical indicator collet 223 with the locating pin 52, and lock the vertical indicator collet 223 to complete setting of the highest picture composition boundary;

S5: Press all locating switch handles 53, rotate the rotary disc 21 to the lowest scene of interest, align the locating pin 52 with the next locating hole 221 outward, raise up the locating switch handles 53 completely, lock the rotary disc 21, then move another vertical indicator collet 223 to align the vertical indicator collet 223 with the locating pin 52, and lock the vertical indicator collet 223 to complete setting of the lowest picture composition boundary;

S6: Rotate the rotary disc 21 to the highest and leftmost picture composition boundary, align the locating pin 52 with the vertical indicator collet 223, and raise up the locating switch handle 53 completely, lock the rotary disc 21, and complete a rectangular panoramic picture composition and point the lens to the upper left corner by above steps;

S7: Press the shutter to take a picture, rotate the horizontal rotating device 1 to the right, take a picture as often as rotate one indexing interval, until indicator collet 111a on the side of the horizontal rotating device 1 is aligned with the reference point hole, thus completing shooting of one row;

S8: Then press the locating switch handle 53, rotate the vertical indexing disc 22 downwards to desired interval, raise up the locating switch handle 53, and lock the rotary disc 21;

S9: Repeat the step S7 reversely, until the reference point hole on the side of the horizontal rotating device 1 return to 0 degree, then repeat the step S8; and S10: Repeat the steps S7-S9, until the whole rectangle is covered, and complete panoramic image capture.

After the panoramic image capture system is employed, users can concentrate on shooting by composing the panoramic picture in advance, thus avoiding missing or duplicate pictures, greatly improving efficiency of panoramic image capture, and decreasing the risk of destroying the whole panorama due to missing or misaligned picture, leaving holes in the panorama. The pictures captured can be arranged in a matrix along a zigzag pattern in the stitching software and each has precise coordinates, which greatly improves efficiency and success rate of image stitching.

It is understood that the foregoing is only the preferred examples of the invention, so cannot limit the proprietary scope of the invention, and all equivalent structures or equivalent flow transformation which are made by use of the specification and accompanying drawings of the invention and directly or indirectly applied in other related fields, are similarly included within the scope of patent protection of the invention.

What is claimed is:

1. A multifunctional panoramic head, comprising a horizontal rotating device, a vertical rotating device, as well as a transverse arm and a vertical arm connecting the horizontal rotating device and the vertical rotating device together, wherein the vertical rotating device comprises a rotary disc, a vertical indexing disc and a locating component, the rotary disc and the vertical indexing disc are set on the upper part of the vertical arm, the locating component is set within the vertical arm, and the locating component comprises a locating component body, a plurality of locating pins which are assembled together with the locating component body and a locating switch handle which can control the locating pins to stretch out and draw back.

2. The multifunctional panoramic head according to claim 1, wherein multiple lines of locating through-slots distributed along concentric circles are set on the locating component body, a spring is also set on the locating pins, the locating pins and the spring pass through the locating through-slots and are assembled together with the locating switch handle.

3. The multifunctional panoramic head according to claim 2, wherein multiple lines of locating holes distributed along concentric circles are set on the vertical indexing disc, and the locating through-slots on the locating component body correspond to the locating holes.

4. The multifunctional panoramic head according to claim 3, wherein a central angle corresponding to adjacent locating through-slots in the same line is equal to the central angle of the corresponding locating holes multiplied by a multiple, and the multiple is an integral plus 1/n, wherein, n is the number of the locating slots in this line.

5. The multifunctional panoramic head according to claim 4, wherein the vertical rotating device is setup with a rotary disc locking handle for fixing the rotary disc, an angle value is marked at the locating holes of the vertical indexing disc, and the vertical indexing disc is also setup with a vertical indicator collets for indicating angle limits.

6. The multifunctional panoramic head according to claim 5, wherein the horizontal rotating device comprises a quick release structure component and a rotating component set below the quick release structure component, and the horizontal rotating device is movably connected with the transverse arm.

7. The multifunctional panoramic head according to claim 6, wherein the rotating component comprises a rotary locating disc which, on the upper part, has a plurality of circles of rotary locating holes distributed along concentric circles.

8. The multifunctional panoramic head according to claim 7, wherein the quick release structure component comprises a quick release structure body, multiple plunger holders set on both ends of the quick release structure body, an encircling locking ring and a locking handle for locking the quick release structure body with the rotating component.

9. The multifunctional panoramic head according to claim 8, wherein the plunger holders are setup with plungers in coordination with the rotary locating holes, a central angle corresponding to adjacent plungers is equal to the central angle of the coordinated rotary locating holes multiplied by a multiple, and the multiple is an integral plus 1/n, wherein, n is the number of the plungers in the same concentric circle.

10. The multifunctional panoramic head according to claim 9, wherein the quick release structure component also comprises a locking press block and a quick release locking handle for fixing the locking press block on the quick release structure body, and the locking press block locks the horizontal rotating device on the transverse arm.

11. The multifunctional panoramic head according to claim 10, wherein the rotating component comprises a dial piece, a rotary locating disc and a rotary disc base, the rotary locating disc is fixed on the rotary disc base by screws on the side, and an indicator collet is also set on the side of the dial piece for setting the angle limit.

12. The multifunctional panoramic head according to claim 11, wherein the horizontal rotating device also comprises compression nut, an upper bearing and a lower bearing, the quick release structure component comprises an upper bearing groove, the rotary disc base is setup with an external thread, a lower bearing groove and a cylinder for being locked by the encircling locking ring, and the compression nut connects the upper bearing, the lower bearing, the quick release structure component and the rotary disc base into one.

13. The multifunctional panoramic head according to claim 12, wherein a lighting device is also set within the vertical arm, and the lighting device comprises a battery pack, a battery holder for installing the battery pack, a battery cover, an LED light and a switch.

14. The multifunctional panoramic head according to claim 13, wherein a cantilever which is assembled together with the vertical indexing disc and can mount a camera is set on the vertical arm.

15. A panoramic image capture system, comprising a camera and a lens, and a multifunctional panoramic head comprising a horizontal rotating device, a vertical rotating device, as well as a transverse arm and a vertical arm connecting the horizontal rotating device and the vertical rotating device together, wherein the vertical rotating device comprises a rotary disc, a vertical indexing disc and a locating component, the rotary disc and the vertical indexing disc are set on the upper part of the vertical arm, the locating component is set within the vertical arm, and the locating component comprises a locating component body, a plurality of locating pins which are assembled together with the locating component body and a locating switch handle which can control the locating pins to stretch out and draw back.

16. The panoramic image capture system according to claim 15, wherein multiple lines of locating through-slots distributed along concentric circles are set on the locating component body, a spring is also set on the locating pins, the locating pins and the spring pass through the locating through-slots and are assembled together with the locating switch handle.

17. The panoramic image capture system according to claim 16, wherein multiple lines of locating holes distributed along concentric circles are set on the vertical indexing disc, and the locating through-slots on the locating component body correspond to the locating holes.

18. The panoramic image capture system according to claim 17, wherein a central angle corresponding to adjacent locating through-slots in the same line is equal to the central angle of the corresponding locating holes multiplied by a multiple, and the multiple is an integral plus 1/n, wherein, n is the number of the locating slots in this line.

19. The panoramic image capture system according to claim 18, wherein the vertical rotating device is setup with a rotary disc locking handle for fixing the rotary disc, an angle value is marked at the locating holes of the vertical indexing disc, and the vertical indexing disc is also setup with a vertical indicator collets for indicating angle limits.

20. The panoramic image capture system according to claim 19, wherein the horizontal rotating device comprises a quick release structure component and a rotating component set below the quick release structure component, and the horizontal rotating device is movably connected with the transverse arm.

* * * * *